United States Patent [19]

Cowan, Jr. et al.

[11] Patent Number: 5,552,649
[45] Date of Patent: Sep. 3, 1996

[54] SEGMENTED RAIL LINEAR INDUCTION MOTOR

[76] Inventors: Maynard Cowan, Jr., 1107 Stagecoach Rd. SE.; Barry M. Marder, 1412 Pinnacle View Dr. NE., both of Albuquerque, N.M. 87123

[21] Appl. No.: 336,351

[22] Filed: Nov. 8, 1994

[51] Int. Cl.⁶ .......................... H02K 41/02; B60L 13/03
[52] U.S. Cl. .......................... 310/12; 104/290; 104/294
[58] Field of Search .......................... 310/12; 104/290, 104/292, 294, 281, 282, 286, 287

[56] References Cited

U.S. PATENT DOCUMENTS

| | | | |
|---|---|---|---|
| 4,727,813 | 3/1988 | Matsue | 104/290 |
| 4,817,494 | 4/1989 | Cowan | 318/38 X |
| 5,086,881 | 2/1992 | Gagnon et al. | 310/12 X |

*Primary Examiner*—Steven L. Stephan
*Assistant Examiner*—Judson H. Jones
*Attorney, Agent, or Firm*—George H. Libman

[57] ABSTRACT

A segmented rail linear induction motor has a segmented rail consisting of a plurality of nonferrous electrically conductive segments aligned along a guideway. The motor further includes a carriage including at least one pair of opposed coils fastened to the carriage for moving the carriage. A power source applies an electric current to the coils to induce currents in the conductive surfaces to repel the coils from adjacent edges of the conductive surfaces.

15 Claims, 2 Drawing Sheets

```
PLATE1......PLATE2......PLATE3......PLATE4......PLATE5......PLATE6.. time ↓
TnnnL....TnnnL....TnnnL....TnnnL....TPPPL....TPPPL......... 1
.TnnnL....TnnnL....TnnnL....TPPPL....TPPPL................. 2
..TnnnL....TnnnL....TPPPL....TPPPL........................ 3
..TPPPL....TPPPL....TnnnL....TnnnL....TPPPL............... 4
...TPPPL....TnnnL....TnnnL....TnnnL....TnnnL.............. 5
....TPPPL....TnnnL....TnnnL....TnnnL....TnnnL............. 6
.....TnnnL....TPPPL....TnnnL....TnnnL....TnnnL............ 7
......TnnnL....TPPPL....TnnnL....TnnnL....TnnnL........... 8
.......TPPPL....TnnnL....TnnnL....TnnnL....TnnnL.......... 9
........TPPPL....TnnnL....TnnnL....TnnnL....TnnnL......... 10
.........TnnnL....TPPPL....TnnnL....TnnnL....TnnnL........ 11
..........TnnnL....TPPPL....TnnnL....TnnnL....TPPPL...→   13 coil #:  22f    22e    22d    22c    22b    22a

FIG-5a

PLATE1......PLATE2......PLATE3......PLATE4......PLATE5.......  time
TnnnL..TPPPL..TnnnL..TnnnL..TPPPL.........                     1
.TnnnnL..TnnnL..TnnnnL..TnnnnL..TnnnnL....                     2
..TnnnnL..TnnnL..TnnnnL..TnnnnL..TnnnnL..→                    3
..TPPPPL..TnnnnL..TnnnnL..TnnnnL..TnnnnL.                      5
...TPPPPL..TnnnnL..TnnnnL..TnnnnL..TnnnL.→                    7
....TnnnL..TPPPPL..TnnnnL..TnnnnL..TnnnnL.→                   9
......TnnnL..TPPPPL..TnnnnL..TnnnL..TnnnnL..TnnnnL..→        11
.......TnnnL..TPPPPL..TnnnnL..TnnnnL..TPPPPL..→              13
.........TPPPPL..TnnnnL..TnnnnL..TPPPPL..TnnnL..→            15 coil #:  22f    22e    22d    22c    22b    22a

SEGMENTED RAIL LINEAR INDUCTION MOTOR

The United States Government has rights in this invention pursuant to Contract No. DE-AC04-76DP00789 between the Department of Energy and American Telephone and Telegraph Company.

BACKGROUND OF THE INVENTION

An affordable rail vehicle that could travel in excess of 250 mph (110 m/s) would be a desirable alternative to the airplane in densely populated areas. Attempts to make such a vehicle using conventional wheel drive, such as the Japanese Bullet Train, require specially constructed drive rails to absorb the tremendous forces generated by the drive wheels. Such trains cannot be used on conventional rails.

The linear induction motor has been proposed as the propulsion system for such a vehicle. Much lighter rail construction may be used when the rails are not subject to the driving force. Linear induction motors have been known for many years and typically include an armature or reaction rail extending along the track and a powered stator carried by the vehicle. The reaction rail typically is a continuous length of nonferrous metal such as aluminum. In operation, the stator coils induce eddy currents in the reaction rail which create magnetic fields that react with the magnetic fields of the stator coils to cause the stator to move relative to the reaction rail.

Because of edge effects and penetration time, conventional linear induction motors have inherent velocity limitations related to their length; i.e., the longer the motor, the higher the potential speed of the motor. To overcome this limitation, applicant has designed a linear motor based on the principles of the *Magnetic Reconnection Launcher* of his earlier U.S. Pat. No. 4,817,494, issued Apr. 4, 1989, which patent is incorporated herein by reference. This patent describes an electromagnetic gun where an aluminum plate is projected at high velocity by energizing a pair of coils as the trailing edge of the plate traverses a gap between the coils.

SUMMARY OF THE INVENTION

It is an object of this invention to provide a high velocity linear induction motor.

It is another object of this invention to provide a linear induction motor with a segmented reaction rail.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a segmented rail phased induction motor having a guideway extending along a prescribed path and a segmented rail consisting of a plurality of nonferrous segments having two parallel and opposed electrically conductive surfaces aligned along the guideway, with each segment spaced from each adjoining segment by a segment gap. The motor further includes a carriage for moving along the prescribed path. The carriage means includes a carriage body, means such as wheels for supporting the carriage body for movement along the guideway, and coils fastened to said carriage body for controlling movement of the carriage, the coils preferably being opposed coils separated from each other by a coil gap. The length of the coils in a direction parallel to the path is no greater than the length of each rail segment. Guiding means are provided for guiding the carriage body along the guideway so the coils pass along the rail without touching the rail. A power source applies an electric current to the coils to induce currents in conductive surfaces adjacent the coils to repel the coils from adjacent edges of the conductive surfaces. Preferably, the carriage is accelerated when the power source provides current to the coils during an acceleration time window extending from when the leading edge of the coil becomes adjacent a segment gap to when the coils are completely adjacent a segment gap, and the carriage is decelerated when the power source provides current to the coil during a deceleration time window extending from when the coil gap begins to be filled by a rail segment to when the coil gap is completely filled by a rail segment.

BRIEF DESCRIPTION OF THE DRAWINGS

The accompanying drawings, which are incorporated in and form part of the specification, illustrate an embodiment of the present invention and, together with the description, serve to explain the principles of the invention.

FIGS. 5a and 5b show the timing of the power source for a plurality of stator coils and reaction rail segments.

DETAILED DESCRIPTION OF THE INVENTION

Figure 1:
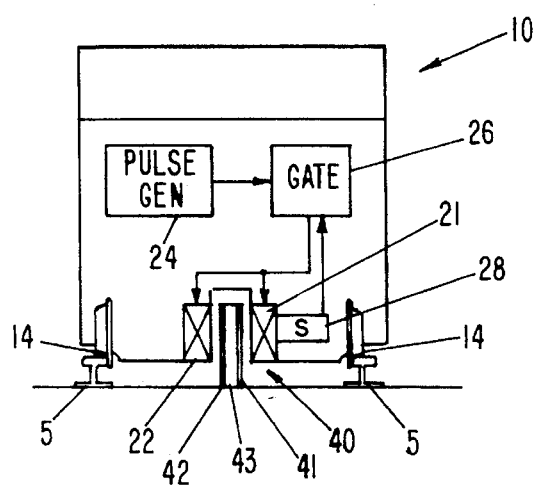
FIG. 1 shows a plan view of a rail vehicle including the linear induction motor of this invention.

As shown in FIG. 1, a segmented rail linear induction motor 10 includes a carriage, such as rail vehicle 12, which is supported for movement along a guideway. As shown, support is provided by conventional flanged wheels 14 which roll along conventional rails 5. The particular details of carriage, guideway, and supporting structure are known in the art and can take many forms, including suspending the carriage under an overhead rail.

While wheels 14 may be connected to conventional drive means, such as a rotary electric motor (not shown), for slow speed movement of vehicle 12, they will free-wheel at the high speeds for which vehicle 12 is designed. Propulsion of vehicle 12 is provided by a segmented rail linear induction motor which includes at least a pair of spaced coils 21, 22 on vehicle 12 that operatively react with a reaction rail 40 that extends along the guideway parallel to support rails 5. In this embodiment, the flanges of wheels 14 operate against the sides of rails 5 in a conventional manner to guide vehicle 12 so that coils 21, 22 do not touch reaction rail 40.

Figure 2:
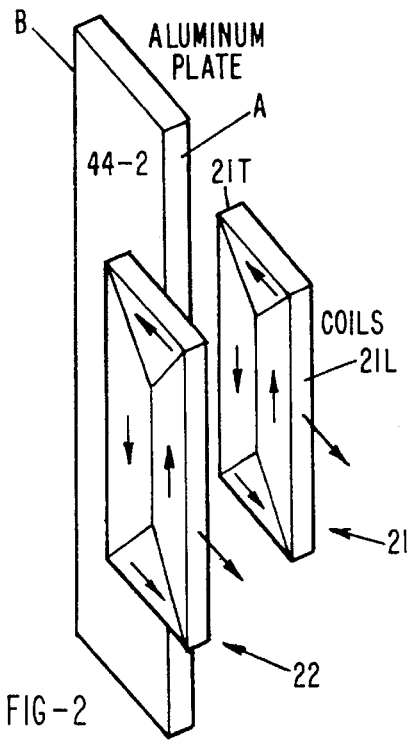
FIG. 2 shows the relationship of the stator and armature of this invention.

Coils 21, 22 are preferably identical and each may include several hundred turns of copper wire in a plane parallel to reaction rail 40. Each coil is shaped, as shown in FIG. 2, with leading and trailing edges relatively straight and extending in a direction perpendicular to the guideway. Coils 21, 22 are selectively energized by high voltage pulses from pulse generator 24 that are directed to coils 21, 22 through gate 26 depending upon the location of the coils with respect to the reaction rail, as detected by sensor 28.

The construction details of reaction rail 40 may take several embodiments. A uniform characteristic of all embodiments is that reaction rail 40 is not a continuous sheet of aluminum; rather, reaction rail 40 is segmented into a plurality of spaced, electrically conductive, plates with spaced edges A and B that are parallel to the leading and trailing edges of the coils. As shown in the embodiment of FIG. 1, rail 40 includes a continuous portion 43 of electrically nonconductive material such as wood or plastic extending parallel to rails 5 and between coils 21, 22. A plurality of nonferrous, electrically conductive plates, such as an aluminum plates 41, 42, is mounted on each side of portion 43. The height of each segment 41, 42, as shown in FIG. 1, extends above the top and below the bottom of coils 21, 22. The width of each segment, in a direction parallel to the path of the vehicle, is preferably no greater than the width of coils 21, 22. As discussed hereinafter, the segments are spaced apart a distance that is at least as large as the width of coils 21, 22.

A second embodiment of reaction rail 40 is shown in FIG. 2 to include one of a plurality of solid nonferrous electrically conductive plates 44 extending along the guideway. Plates 44 could be fastened to the guideway by any known means. Coils 21, 22 are seen to pass on either side of plate 44 in the direction shown by the arrow with leading edge 21L being the first part of coil 21 to overlap a plate, and trailing edge 21T being the last part of coil 21 to overlap a plate.

Figure 3:
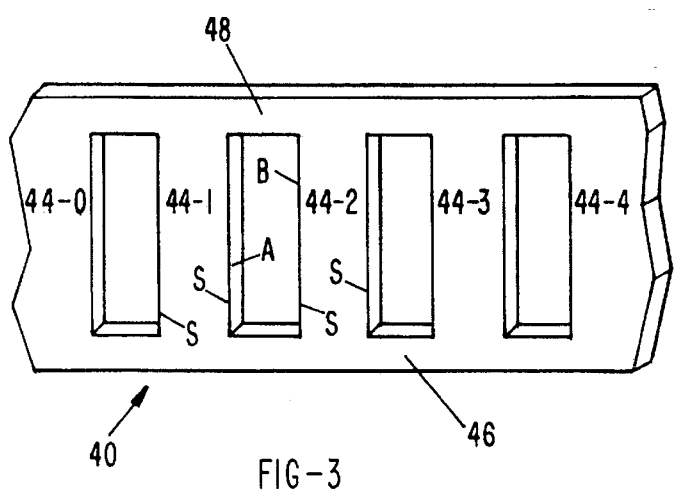
FIG. 3 shows another embodiment of the reaction rail of this invention.

FIG. 3 shows a preferred embodiment of the reaction rail 40 to include a continuous strip of nonferrous metal, such as aluminum, into which slots have been cut. The web of the rail, 44-1, 44-2, are identical to the discrete plates of FIG. 2. Connecting strips of metal 48 and 46 provide rigidity to the rail. The shape of the upper and lower portions of the slot is not important to the operation of the invention so long as the coil height is less than the slot height, and the top and bottom are spaced adjacent the slot. Whether or not the two conducting sides of the reaction rail, or adjacent rail segments, are electrically connected, as they are in the solid plate embodiment of FIG. 3 and as they may not be in the discrete plate example of FIG. 1, is not important to the operation of this invention. At high frequency, induced current does not penetrate into the plates.

The conducting segments are separated from each other by a distance SS that is at least as large as the coil distance between edges 21L and 21T. It is important for the operation of the invention that no coil 21 overlap more than one plate at any instant of time.

Figure 4:
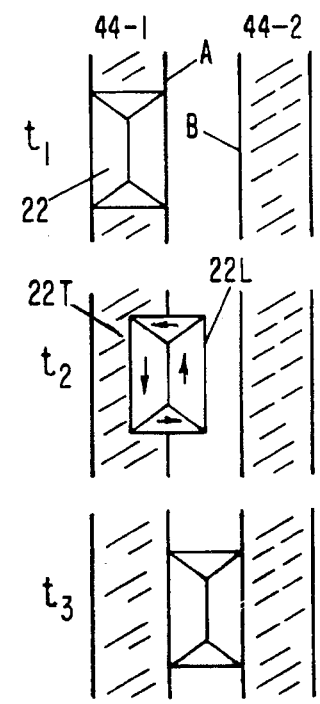
FIG. 4 shows the timing of the power source of the invention.

FIG. 4 illustrates the acceleration window during which coils are energized as they pass the plates. For this embodiment, the width of coil 22, the width of plates 44, and the spacing between adjacent plates are the same. Coil 22 is not energized at time t 1 when it is aligned with plate 44-1. However, once sensor 28 detects that the leading edge 22L of coil 22 has moved by edge A of plate 44-1 adjacent the gap between plates 44-1 and 44-2, gate 26 allows pulses from pulse generator 24 to energize coils 21 and 22. The magnetic field produced by coils 21, 22 reacts with the magnetic field induced at edge A of plate 44-1 by the rapidly changing magnetic field in coils 21, 22 to push coils 21, 22 toward plate 44-2, as shown at time 12. As shown at time 13, when sensor 28 detects that trailing edge 22T of coil 22 has cleared edge A of plate 44-1, the acceleration window closes and gate 26 blocks pulses from pulse generator 24 to coils 21, 22.

Should the current to coils 21, 22 not be stopped when leading edge 22L of coil 22 reaches edge B of plate 44-2, a magnetic field would be induced in plate 44-2 that would exert a force to move coils 21, 22 in the opposite direction of motion, thus dynamically braking carriage 12. This deceleration window extends from the time leading edge 22L comes adjacent to edge B of plate 44-2 and ends when trailing edge 22T passes plate edge 44-2B, that is, when the coil gap is completely filled by plate 44-2. However, for continued acceleration of carriage 12, the current to coils 21, 22 must be off from the time leading edge 22L passes edge B of plate 44-2 until leading edge 22L clears edge A of plate 44. In any configuration, the actual timing of the invention depends on the configuration, as illustrated in FIGS. 5a and 5b.

FIG. 5a schematically represents the passage of a carriage (not shown) powered by six pairs of coils, labeled 22a–22f, by five consecutive plates, labeled PLATE1–PLATE5, spaced along a guideway. Each plate is 6 units wide and is spaced from its adjacent plates by 6 units. Each coil pair is five units wide. The leading edge of each coil is designated with an "L" while the trailing edge is designated with a "T". If current pulses are being applied to the coil, the interior letters are "P"; if current is not being applied, the interior letters are "n". In the discussion hereinafter, since only one coil is illustrated, reference will be made to current being applied to only that coil; however, it should be understood that current is actually applied to both coils 21, 22 of the coil pair.

For the embodiment of FIG. 5a, a coil pair is first pulsed when its leading edge "L" has just cleared the trailing edge "T" of a plate. In this configuration, the pulsed coils propel carriage 12 toward the right of the figure. At time 1, coil 22a is repelled from the edge of PLATE4 and coil 22b is repelled from PLATE5. Coils 22c–22f are not pulsed. The acceleration window for coils 22a and 22b closes at time 3 the trailing edge of coil 22b has cleared PLATE4, and gate 26 switches the electrical power from coil 22b to coil 22f, as the leading edge of that coil has cleared PLATE1. Coils 22e and 22f are pulsed at time 5; coils 22d and 22e at time 7, coils 22c and 22d at time 9, and coils 22b and 22c at time 11. At time 13, the leading edge of coil 22a will clear PLATE6, and the pattern will repeat.

An advantage of this configuration is that the same number of coils are being energized at all times, thus providing a constant load for pulse generator 24. With other configurations, adjustment may have to be made to the energizing time to ensure that the load on generator 24 remains constant.

In the embodiment of FIG. 5b, the plates and plate spacing is the same 6 units as in FIG. 5a; however, the coils are now each 6 units wide with a spacing of 2 units between coils. At time 1, coils 22c and 22f are centered over PLATE3 and PLATE1, respectively, and are not pulsed. Coils 22a and 22d are pulsed. At time 2, coils 22a, 22c, 22d, and 22f all would be pulsed under the conduction standard for the embodiment of FIG. 5a. Since it is not desirable for the load on generator 24 to jump between two and four coils, gate 26 is adjusted to not energize a coil until the leading edge "L" iis two units beyond the edge of the plates. Therefore, coils 22c and 22f do not conduct until time 3, at which time coils 22a and 22d have cleared their plates and have been deenergized. Coils 22b and 22e are pulsed from time 7 to time 10. Coils 22a and 22d again conduct, and the cycle repeats, at time 13.

For an operational system, the coil Width could be on the order of one foot (0.3 meter), so the "units" shown in the examples would be two inches (5 cm). The coil height could be on the order of two feet (0.6 m). Approximately 20 coil pairs would be needed to propel a passenger rail car.

The pulse generator 24 would provide high (on the order of a thousand volts) voltage pulses at about 30% duty cycle at a frequency on the order of several kilohertz. Pulse generator 24 could be located on carriage 12, as shown, and powered by either an external electrical line with a conventional pickup on carriage 12, or by an electric generator powered by a combustion engine. One configuration of pulse generator 24 uses a high power frequency converter that would drive the gated coils through a transformer powered by a DC prime power source and switched by thyristors. Other configurations are also possible, as is known to those skilled in the art.

Sensor 28 may be a photocell that detects light reflecting from the plates, a metal detector responsive to the plates, or any other known sensor. The system may be easily implemented by placing a senisor and a simple logic circuit at each coil pair to send signal to gate 26 when pulses were to be delivered to the coils.

The particular sizes and equipment discussed above are cited merely to illustrate a particular embodiment of this invention. It is contemplated that the use of the invention may involve components having different sizes and shapes as long as the principle of using a segmented nonferrous rail to magnetically repel coils that induce magnetic fields into the rail, is followed. It is intended that the scope of the invention be defined by the claims appended hereto.

I claim:

1. A segmented rail linear induction motor comprising:
   a prescribed path comprising:
      a guideway extending along a route defining said path;
      a segmented rail comprising a plurality of segments aligned along said guideway, each segment having two opposed nonferrous metal surfaces, each segment being spaced from each adjoining segment by a segment gap defined by straight edges of each segment extending perpendicular to said guideway; and
   carriage means for moving along said prescribed path, said carriage means comprising:
      a carriage body;
      means for supporting said carriage body for movement along said guideway;
      coil means for controlling movement of said carriage body along said guideway, the length of said coils in a direction parallel to said path being no greater than the segment gap;
      means for guiding said carriage body along said guideway with said segments passing parallel to said coil means without touching said coil means; and
      power means for applying an electric current to said coil means to induce currents in said conductive surfaces to repel said coil means from said straight edges of said conductive surfaces When said edges are adjacent said coil means.

2. The segmented linear induction motor of claim 1 wherein said coil means comprise a pair of opposed coils fastened to said carriage body, said opposed coils being separated from each other by a coil gap, each of said coils having a leading edge and a trailing edge extending in a direction parallel to said straight edges of said segments.

3. The segmented linear induction motor of claim 2 wherein said carriage means are accelerated when said power means provides current to said coil means during an acceleration time window extending from when the leading edge becomes adjacent a segment gap to when said coils are completely adjacent a segment gap, and said carriage means being decelerated when said power means provides current to said coil during a deceleration time window extending from when the leading edge becomes adjacent a rail segment to when said coil gap is completely filled by a rail segment.

4. The segmented rail linear induction motor of claim 1 wherein said rail is a continuous sheet of nonferrous mental, and said segment gaps are defined by holes cut in said sheet, said holes having vertical sides.

5. The segmented rail linear induction motor of claim 1 wherein said rail is a continuous sheet of nonconducting material, and said segments are defined by rectangular nonferrous metal plates attached to said sheet.

6. The segmented rail linear induction motor of claim 4 wherein said metal is aluminum.

7. The segmented rail linear induction motor of claim 1 wherein said power means comprises:
   a high frequency pulsed power source; and
   gate means for controlling the application of the output of said source to said coil means, said gate means providing pulses to said coil means only during the acceleration window to accelerate said carriage body, and to said coil means only during the deceleration window to dynamically brake said carriage body.

8. A segmented rail linear induction motor comprising:
   a prescribed path comprising:
      a guideway extending along a route defining said path;
      a segmented rail comprising plurality of segments, each segment having two parallel and opposed nonferrous electrically conductive surfaces, said plurality of segments being aligned along said guideway with said surfaces parallel to said guideway, each segment being spaced from each adjoining segment by a segment gap; and
   carriage means for moving along said prescribed path, said carriage means comprising:
      a carriage body;
      means for supporting said carriage body for movement along said guideway;
      coil means for controlling movement of said carriage body along said guideway, said coil means comprising a pair of opposed coils fastened to said carriage body, said opposed coils being separated from each other by a coil gap, said coils having a leading edge and a trailing edge, the length of said coils in a direction parallel to said path being the distance between said leading and trailing edges and being no greater than the segment gap;
      means for guiding said carriage body along said guideway with said segments passing through said coil gap without touching said coil means; and
      power means for applying an electric current to said coil means to induce currents in said conductive surfaces to repel said coil means from adjacent edges of said conductive surfaces, said carriage means being accelerated when said power means provides current to said coil means during an acceleration time window extending from when the leading edge becomes adjacent a segment gap to when said coils are completely adjacent a segment gap, and said carriage means being decelerated when said power means provides current to said coil during a deceleration time window extending from when the leading edge becomes adjacent a rail segment to when said coil gap is completely filled by a rail segment.

9. The segmented rail linear induction motor of claim 8 wherein said acceleration time window begins when a portion of the coil gap has moved past said segment.

10. The segmented rail linear induction motor of claim 9 wherein said portion is about ⅓ the length of said coils.

11. The segmented rail linear induction motor of claim 8 wherein the deceleration time window ends when only a portion of the coil gap remains to be filled by a rail segment.

12. The segmented rail linear induction motor of claim 8 wherein said portion is about ⅓ the length of said coils.

13. The segmented rail linear induction motor of claim 8 wherein said power means comprises:

a high frequency pulsed power source; and gate means for controlling the application of the output of said source to said coil means, said gate means providing pulses to said coil means only during the acceleration window to accelerate said carriage body, and to said coil means only during the deceleration window to dynamically brake said carriage body.

14. The segmented linear induction motor of claim 8 wherein said coil means comprises a plurality of aligned pairs of opposed coils.

15. The segmented linear induction motor of claim 8 wherein said leading and trailing edges are straight and extend perpendicular to the guideway.

* * * * *